United States Patent
Tien et al.

(10) Patent No.: US 7,896,691 B2
(45) Date of Patent: Mar. 1, 2011

(54) ELECTRONIC DEVICE AND AIRPROOF CONNECTOR MODULE THEREOF

(75) Inventors: Kai-Chen Tien, Taipei (TW); Chih-Chieh Chou, Taipei (TW); Hung-Chang Huang, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 12/543,946

(22) Filed: Aug. 19, 2009

(65) Prior Publication Data
US 2010/0048052 A1 Feb. 25, 2010

(30) Foreign Application Priority Data
Aug. 20, 2008 (TW) .............................. 97131765 A

(51) Int. Cl.
*H01R 13/52* (2006.01)
(52) U.S. Cl. ........................................................ 439/533
(58) Field of Classification Search .................. 439/533, 439/271, 539, 34, 277; 361/725, 686
See application file for complete search history.

(56) References Cited

U.S. PATENT DOCUMENTS

| | | | | |
|---|---|---|---|---|
| 5,123,862 | A | * | 6/1992 | Suzuki .......................... 439/533 |
| 6,075,706 | A | * | 6/2000 | Learmonth et al. ........... 361/737 |
| 6,250,962 | B1 | | 6/2001 | Shinozaki |
| 6,900,983 | B2 | * | 5/2005 | Glusing et al. ........... 361/679.02 |
| 2005/0060467 | A1 | * | 3/2005 | Wieck ........................... 710/303 |

FOREIGN PATENT DOCUMENTS

CN 201035482 Y 3/2008

* cited by examiner

*Primary Examiner* — Jean F Duverne
(74) *Attorney, Agent, or Firm* — Muncy, Geissler, Olds & Lowe, PLLC

(57) ABSTRACT

An electronic device and an airproof connector module thereof are provided. The electronic device is connected to a peripheral device by the connector module. The connector module includes a casing, an adapting board, a first connector, a second connector, a first elastic sealing element, and a second elastic sealing element. The adapting board is disposed in a containing space in the casing. The casing has a connection hole and an opening. The first connector is disposed at the connection hole, and the second connector is disposed at the opening. The first connector and the second connector are coupled to the adapting board. The first elastic sealing element fills space between the first connector and the connection hole. The second elastic sealing element fills space between the second connector and the opening.

16 Claims, 3 Drawing Sheets

ELECTRONIC DEVICE AND AIRPROOF CONNECTOR MODULE THEREOF

CROSS REFERENCE TO RELATED APPLICATIONS

This Non-provisional application claims priority under 35 U.S.C. §119(a) on Patent Application No(s). 097131765 filed in Taiwan, Republic of China on Aug. 20, 2008, the entire contents of which are hereby incorporated by reference.

BACKGROUND OF THE INVENTION

1. Field of Invention

The invention relates to a connector module and, more particular, to an electronic device and an airproof connector module thereof.

2. Related Art

Characteristics of an industry computer are solid, shockproof, dustproof, moisture-proof, and resistant to a high temperature. The industry computer has a plurality of slots for expansion. The industry computer is a best operating platform for different industry control, traffic control, environmental control, and other applications in an automatic field.

Different from a general personal computer, the industry computer is generally used at a bad operation environment. For example, the industry computer may be used at a concrete batching production line, a copper smelting batching production line, or the seaside. In the operation environment of the industry computer, the industry computer often needs to be connected with machines on the scene. Input/output (I/O) connectors are necessaries for connecting the machines on the scene. Since the connection part between the I/O connectors and the whole system are not airproof, water and salt fog penetrate easily, thus increasing the short-circuit possibility of the whole system.

Since the I/O connectors of the industry computer do not have a waterproof design, water fog and salt fog are easy to penetrate into the motherboard and other components in the interior of the computer, thus to cause the system unstable. The I/O connectors are weakness of the industry computer in a waterproof aspect.

SUMMARY OF THE INVENTION

This invention provides an electronic device and an airproof connector module thereof. The connector module may be widely adapted to different kinds of computers, more particularly, to industry computers in need of a waterproof design.

The embodiment of the invention provides an electronic device and an airproof connector module thereof. A waterproof design is provided for connection places of the electronic device and the connector module. Foreign matters out of the connector module cannot penetrate into a motherboard and hardware in the interior of the electronic device.

The embodiment of the invention provides an electronic device and an airproof connector module thereof. The electronic device is connected to a peripheral device by the connector module. The connector module includes a casing, an adapting board, a first connector, a second connector, a first elastic sealing element, and a second elastic sealing element. The adapting board is disposed in a containing space in the casing. The casing has a connection hole and an opening. The first connector is disposed at the connection hole, and the second connector is disposed at the opening. The first connector and the second connector are coupled to the adapting board. The first elastic sealing element fills space between the first connector and the connection hole. The second elastic sealing element fills space between the second connector and the opening.

The embodiment of the invention provides an electronic device having an airproof connector module. The electronic device includes a motherboard having a connector and the connector module.

The beneficial effect of the invention is that waterproof devices are disposed at the connector module and the connector of the electronic device in cooperation with the connector module. Thus, the electronic device forms an airproof space. Foreign matters, such as water fog and so on, out of the connector module cannot penetrate into the interior of the industry computer, thereby reducing failure possibility of the circuit caused by pollution of the foreign matters.

These and other features, aspects, and advantages of the present invention will become better understood with regard to the following description, appended claims, and accompanying drawings.

DETAILED DESCRIPTION OF THE INVENTION

In this embodiment, a connector module is installed on an industry computer in a plugging and releasing mode. The industry computer is connected to other devices by the connector module. In other embodiments, the connector module may also be adapted to a personal computer or a portable electronic device and so on in need of a waterproof design.

Figure 1:
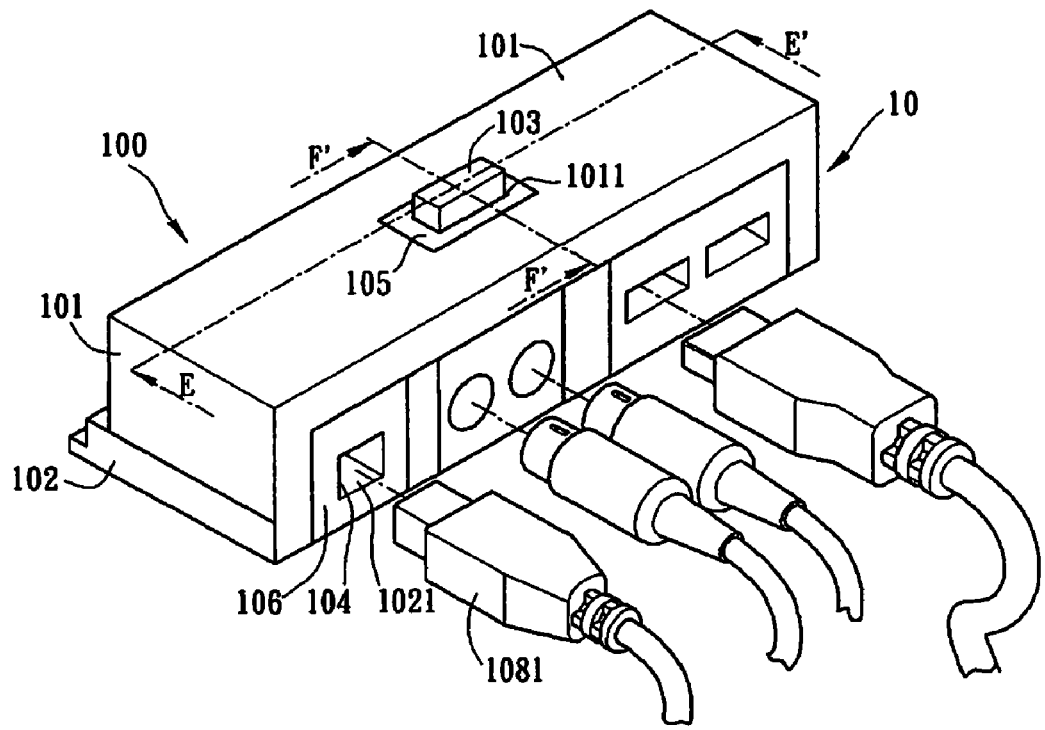
FIG. 1 is a three-dimensional diagram showing a connector module according to a preferred embodiment of the invention.

FIG. 1 is a three-dimensional diagram showing a connector module 100 according to a preferred embodiment of the invention.

In the embodiment, the connector module 100 can be plugged into or released from an electronic device including a connector, and the connector module 100 may be connected to a peripheral device 200. The connection relation between the connector module 100 and the electronic device and the peripheral device 200 is described in detail hereinbelow.

The connector module 100 includes a casing 10, a first connector 103, a second connector 104, a first elastic sealing element 105, and a second elastic sealing element 106. The casing 10 has a containing space, and the casing 10 includes a first casing 101 and a second casing 102. The second casing 102 is connected with the first casing 101 to form the containing space.

The first casing 101 has a connection hole 1011 and an opening 1021. In the embodiment, the first connector 103 is disposed at the connection hole 1011, and the first connector 103 extends from the connection hole 1011. One terminal of the first connector 103 exposed to the first casing 101 is electrically connected with a connector of an electronic device (not shown).

In the embodiment, the first connector 103 is a multifunction connector for connecting the electronic device and transmitting a plurality of signals to the electronic device. The first connector 103 capable of being plugged into or released from the connector of the electronic device. If the electronic device does not need to communicate with other devices, the first connector 103 can be released from the connector of the electronic device. The connector of the electronic device can be sealed by a sealing device. The connection relation between the connector module 100 and the electronic device is described in detail hereinbelow.

The second connector 104 is disposed at the opening 1021 of the first casing 101 for connecting a connector 1081 of the peripheral device 200 (or called external device). In the embodiment, the second connector 104 can be different kinds of I/O connectors, such as a universal serial bus (USB) connector, a PS/2 connector, a VGA connector, an IEEE 1394 connector and so on, suitable for receiving the corresponding connector 1081.

The situation when the connector 1081 is plugged into the second connector 104 is taken for example to describe the sealing of the connector module 100 in the embodiment.

Figure 2:
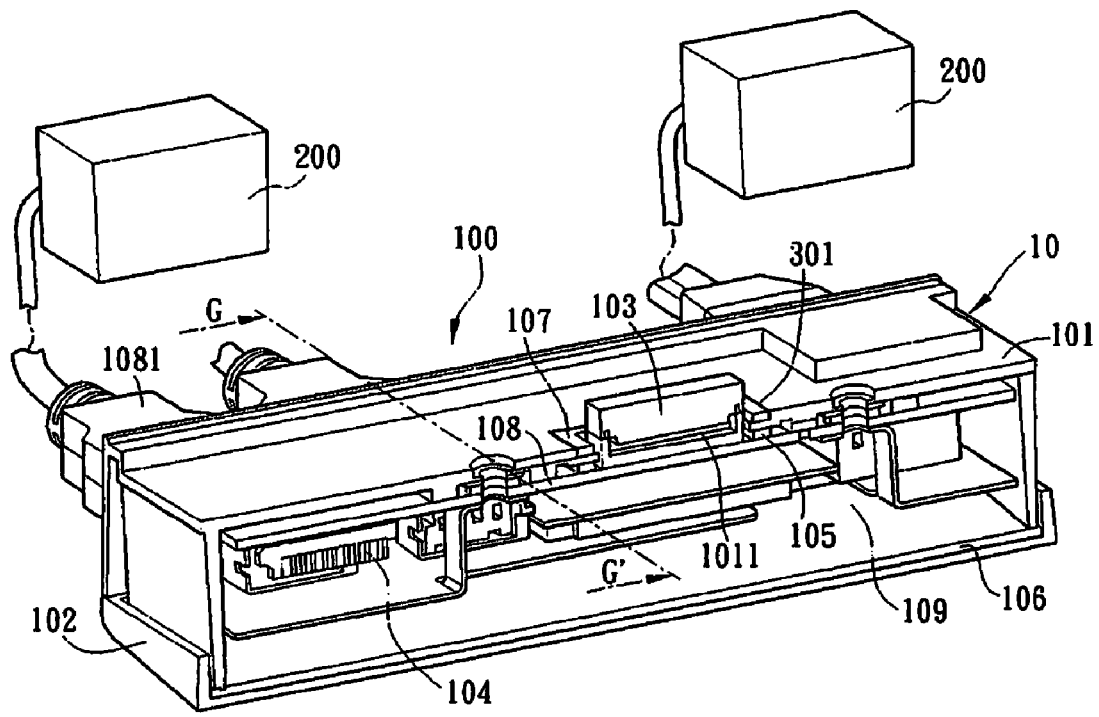
FIG. 2 is a sectional diagram showing the connector module in FIG. 1 along the line E-E'.

FIG. 2 is a sectional diagram showing the connector module 100 in FIG. 1 along the line E-E'.

Please refer to FIG. 1 and FIG. 2. The first casing 101 is connected with the second casing 102 to form a containing space 109. The connector module 100 provided by the embodiment further includes an adapting board 108. The adapting board 108 is disposed in the containing space 109. In addition, one terminal of the first connector 103 and one terminal of the second connector 104 are disposed in the containing space 109. The first connector 103 and the second connector 104 are coupled to the adapting board 108. In the embodiment, after the first casing 101 is connected with the second casing 102, the opening 1021 exposes the second connector 104. The second connector 104 can be electrically connected with the connector 1081 of the peripheral device 200. The second connector 104 may be a USB connector, and the connector 1081 may be a USB plug.

In the embodiment, the first elastic sealing element 105 is disposed in the containing space 109, and it tightly covers the first connector 103 at the connection place of the first connector 103 and the connection hole 1011 to fill the space between the first connector 103 and the connection hole 1011.

In the embodiment, the second elastic sealing element 106 is disposed in the containing space 109, and it tightly covers the second connector 104 at the connection place of the second connector 104 and the connector 1081 to fill the space between the connector 1081, the second connector 104, and the opening 1021. After the connector 1081 is plugged into the second connector 104, the second elastic sealing element 106 can be tightly fitted with the connector 1081 to achieve a waterproof function.

In FIG. 2, the second elastic sealing element 106 further extends to the connection place of the first casing 101 and the second casing 102. Thus, the second elastic sealing element 106 is used for sealing both the connection place and the opening of the first casing 101 and the second casing 102 to prevent water fog, slat fog and so on from penetrating into a circuit board in the interior of the casing.

In FIG. 2, a third elastic sealing element 107 is shown. In the embodiment, the third elastic sealing element 107 is disposed outside of the casing 10 and is circular. A circular groove 301 is formed around the connection hole 1011 of the casing 10. The connector module 100 further includes the third elastic sealing element 107 disposed in the circular groove 301 and tightly fitted with the first connector 103 to cover the first connector 103 at the connection place of the first connector 103 and the connection hole 1011. The width of the third elastic sealing element 107 can be greater than that of the circular groove 301 a little. Thereby, the third elastic sealing element 107 can be tightly against a side wall of the first connector 103 to be tightly fitted with the first connector 103, further to seal the space between the connection hole 1011 and the first connector 103, thus filling the space between the first connector 103 and the connection hole 1011.

The third elastic sealing element 107 cooperates with the first elastic sealing element 105 in the containing space 109. That is, two layers of waterproof sealing elements are disposed at the connection hole 1011 to enhance an airproof function of the connection hole 1011.

Figure 3:
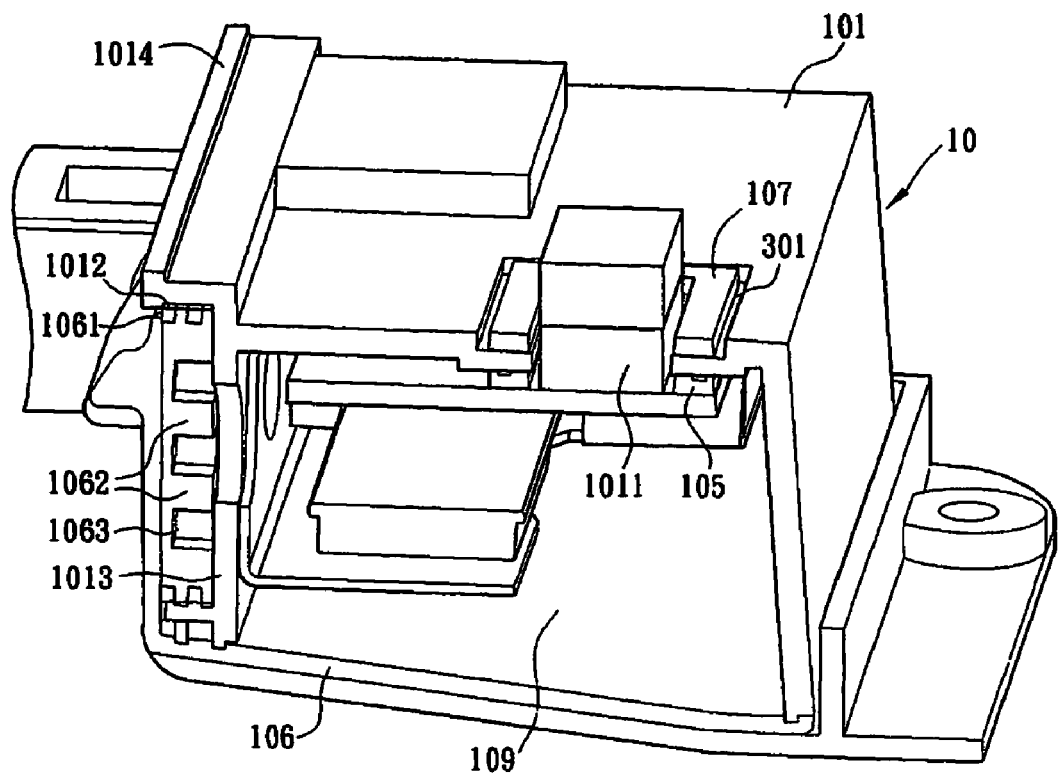
FIG. 3 is a sectional diagram showing the connector module in FIG. 1 along the line F-F'.

FIG. 3 is a sectional diagram showing the connector module 100 in FIG. 1 along the line F-F'.

In FIG. 3, an internal structure of the second elastic sealing element 106 is shown. The casing 10 has a protrudent rectangular side edge 1014 at a side surface 1013 having an opening. The second elastic sealing element 106 has a plurality of saw-toothed grooves 1061. Correspondingly, the side edge 1014 of the casing 10 has a plurality of protrudent portions 1012. The protrudent portions 1012 can be fastened to grooves 1061 of the second elastic sealing element 106. In other embodiments, the grooves 1061 may be wavy or have other shapes, as long as the protrudent portions 1012 at the side edge 1014 of the casing 10 have a corresponding shape for fastening.

The second elastic sealing element 106 further includes a plurality of retaining walls 1062 at the connection place with the casing 10. Adjacent retaining walls 1062 form a waterproof groove 1063. The retaining walls 1062 are against the side surface of the casing 10. Thus, even though foreign matters such as water fog and so on can penetrate from the grooves 1061, the retaining walls 1062 can retain the foreign matters in the waterproof grooves to prevent the foreign matters from penetrating into the containing space 109.

Figure 4:
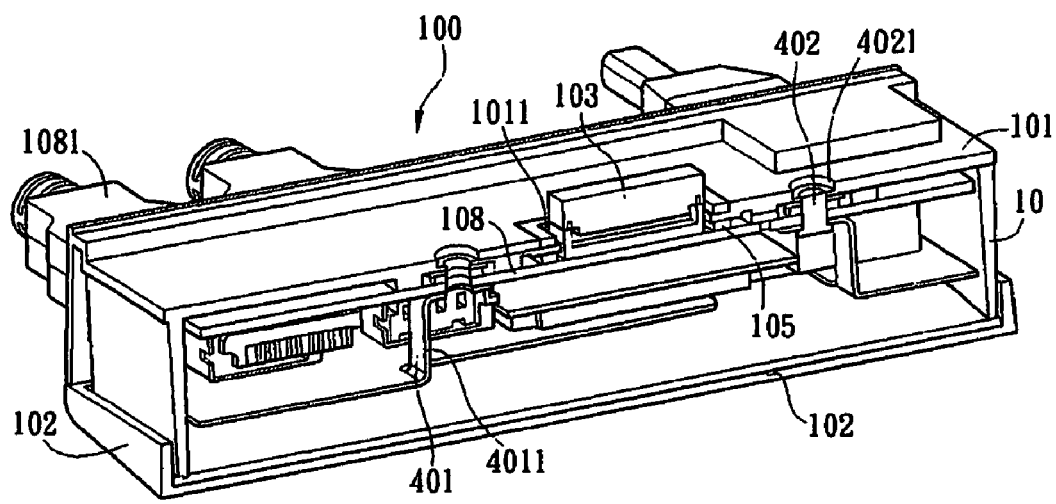
FIG. 4 is a sectional diagram showing the connector module in FIG. 2 along the line G-G'.

FIG. 4 is a sectional diagram showing the connector module 100 in FIG. 2 along the line G-G'.

In the embodiment, at least one electromagnetic interference shielding cover 401 is disposed in the containing space 109 of the connector module 100 to avoid electromagnetic interference caused by transmission of electric signals. In FIG. 4, the electromagnetic interference shielding cover 401 is disposed in the containing space 109 of the connector module 100. The electromagnetic interference shielding cover 401 is disposed at internal surfaces of the first casing 101 and the second casing 102. The electromagnetic interference shielding cover 401 covers the adapting board 108 and the second connector 104, and the electromagnetic interference shielding cover 401 is connected with one terminal of the adapting board 108. In other embodiments, the electromagnetic interference shielding cover 401 may cover one terminal of the first connector 103. In the embodiment, the electromagnetic interference shielding cover 401 further has a plurality of supporting surfaces 4011. Most part of the electromagnetic interference shielding cover 401 is located at the internal surfaces of the first casing 101 and the second casing 102. The supporting surface 4011 extends from a plane of the electromagnetic interference shielding cover 401 covering an internal surface and is against a surface of the adapting board 108. Thus, the electromagnetic interference shielding cover 401 can be regarded as an auxiliary supporting device of the adapting board 108 to fasten the internal components of the connector module.

FIG. 4 is a schematic diagram showing the adapting board 108 fastened to the first casing 101. The first casing 101 has a plurality of screw holes 4021. The adapting board 108 is fastened to the first casing 101 by fastening waterproof screws 402 to the screw holes 4021 of the first casing 101, and the waterproof screws 402 are located in the containing space 109. In the embodiment, the screw holes 4021 are adjacent to the connection hole 1011 of the first casing 101. That is, the screw holes 4021 are extremely adjacent to the connection hole 1011 of the first casing 101 to further press the first elastic sealing element 105 to generate greater interference. Thus, there is enough interference between the first elastic sealing element 105 and the first casing 101, thereby tightly fitting the first elastic sealing element 105 and the first casing 101.

Figure 5:
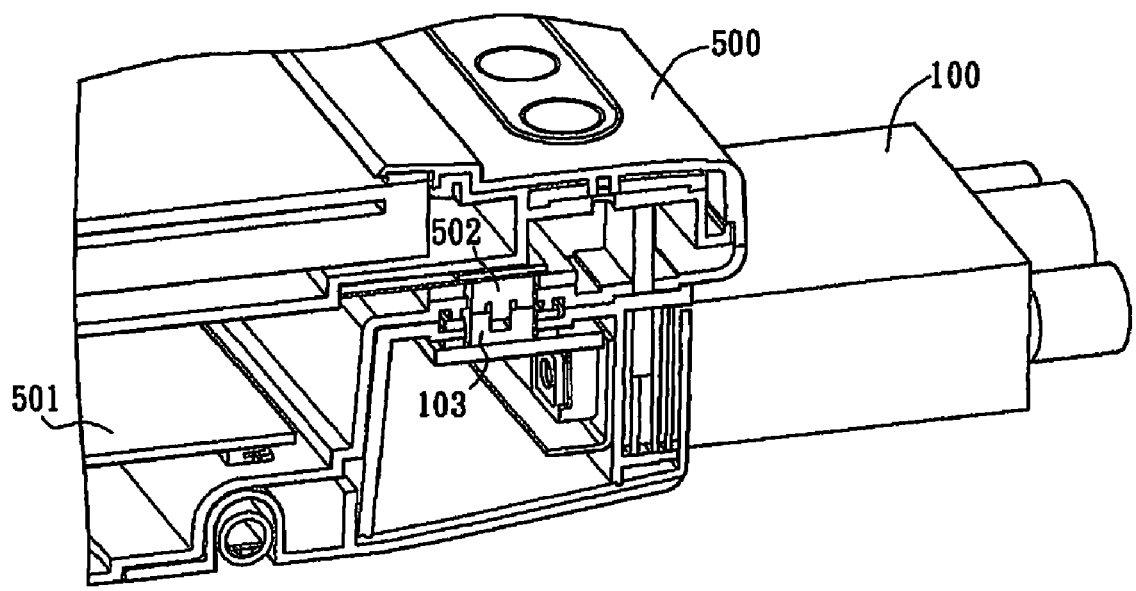
FIG. 5 is a sectional diagram showing a connector module connected to an electronic device according to a preferred embodiment of the invention.

FIG. 5 is a sectional diagram showing the connector module 100 provided by the embodiment connected to an electronic device 500.

The electronic device 500 includes a motherboard 501 coupled to a connector 502. Thus, the motherboard 501 can be coupled to the first connector 103 of the connector module 100 by the connector 502. Thereby, signals between the electronic device 500 and other devices can be transmitted by the connector module 100. In this embodiment, the electronic device 500 is an industry computer. In other embodiments, the electronic device 500 may be a personal computer or a portable communication device in need of a waterproof design.

In the preferred embodiment of the invention, a plurality of elastic sealing elements are used to seal the space between two casings and the space around a plurality of the connectors, thus to form a waterproof and airproof space in the interior of the connector module for containing electronic components. In addition, an elastic sealing element is disposed at the connection place of the connector module and a motherboard of the electronic device. Thus, even if water fog or salt fog penetrates into the interior of the connector module, the elastic sealing element can still prevent the water fog or the salt fog from penetrating into the motherboard of the electronic device, thereby avoiding greater loss.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An airproof connector module capable of being plugged into an electronic device to allow the electronic device to be connected to a peripheral device, the connector module comprising:
   a casing including a first casing and a second casing, wherein a connection hole and an opening are disposed on the first casing, and the second casing is connected with the first casing to form a containing space;
   an adapting board disposed in the containing space;
   a first connector coupled to the adapting board and disposed at the connection hole for connecting the electronic device;
   a second connector coupled to the adapting board and disposed at the opening for connecting the peripheral device;
   a first elastic sealing element filling space between the first connector and the connection hole; and
   a second elastic sealing element filling space between the second connector and the opening and extending to the connection place of the first casing and the second casing.

2. The connector module according to claim 1, wherein the second elastic sealing element has a groove, one side edge of the casing has a protrudent portion, and the protrudent portion of the casing is fastened to the groove of the second elastic sealing element.

3. The connector module according to claim 1, wherein the second elastic sealing element has a plurality of retaining walls, a waterproof groove is formed between each two retaining walls, and the retaining walls are against one side surface of the casing having the opening.

4. The connector module according to claim 1, wherein a circular groove is formed around the connection hole of the casing, and the connector module further includes a third elastic sealing element disposed in the circular groove and tightly fitted with the first connector to fill space between the first connector and the electronic device.

5. The connector module according to claim 1, further comprising:
   at least one electromagnetic interference shielding cover for covering the adapting board, one terminal of the first connector, and one terminal of the second connector, wherein one terminal of the first connector and one terminal of the second connector are located in the containing space.

6. The connector module according to claim 5, wherein the electromagnetic interference shielding cover comprises:
   a supporting surface extending from a plane of the electromagnetic interference shielding cover covering an internal surface of the casing and being against a surface of the adapting board.

7. The connector module according to claim 1, wherein the first elastic sealing element is fastened to the casing by a plurality of waterproof screws, and the waterproof screws are located in the containing space.

8. The connector module according to claim 7, wherein the casing has a plurality of screw holes, and the screw holes are adjacent to the connection hole of the casing to further press the first elastic sealing element.

9. An electronic device comprising:
   a motherboard including a connector; and
   a connector module capable of being plugged into or released from the electronic device to allow the electronic device to be connected to a peripheral device, the connector module including:
   a casing including a first casing and a second casing, wherein a connection hole and an opening are disposed on the first casing, and the second casing is connected with the first casing to form a containing space;
   an adapting board disposed in the containing space;
   a first connector coupled to the adapting board and disposed at the connection hole for connecting the connector of the motherboard;
   a second connector coupled to the adapting board and disposed at the opening for connecting the peripheral device;
   a first elastic sealing element filling space between the first connector and the connection hole; and
   a second elastic sealing element filling space between the second connector and the opening and extending to the connection place of the first casing and the second casing.

10. The electronic device according to claim 9, wherein the second elastic sealing element has a groove, one side edge of the casing has a protrudent portion, and the protrudent portion of the casing is fastened to the groove of the second elastic sealing element.

11. The electronic device according to claim 9, wherein the second elastic sealing element has a plurality of retaining walls, a waterproof groove is formed between each two retaining walls, and the retaining walls are against one side surface of the casing having the opening.

12. The electronic device according to claim 9, wherein a circular groove is formed around the connection hole of the casing, and the connector module further includes a third elastic sealing element disposed in the circular groove and tightly fitted with the first connector to fill space between the first connector and the electronic device.

13. The electronic device according to claim 9, wherein the connector module further comprises:
    at least one electromagnetic interference shielding cover for covering the adapting board, one terminal of the first connector, and one terminal of the second connector, wherein one terminal of the first connector and one terminal of the second connector are located in the containing space.

14. The electronic device according to claim 13, wherein the electromagnetic interference shielding cover comprises:
    a supporting surface extending from a plane of the electromagnetic interference shielding cover covering an internal surface of the casing and being against a surface of the adapting board.

15. The electronic device according to claim 9, wherein the first elastic sealing element is fastened to the casing by a plurality of waterproof screws, and the waterproof screws are located in the containing space.

16. The electronic device according to claim 15, wherein the casing has a plurality of screw holes, and the screw holes are adjacent to the connection hole of the casing to further press the first elastic sealing element.

* * * * *